United States Patent [19]

Kroebel

[11] 3,878,060

[45] Apr. 15, 1975

[54] PROCESS FOR THE ELECTROLYTIC REDUCTION OF FISSIONABLE ELEMENTS

[75] Inventor: Reinhard Kroebel, Leopoldshafen, Germany

[73] Assignee: Bayer Aktiengesellschaft, Leverkusen, Germany

[22] Filed: Aug. 23, 1972

[21] Appl. No.: 283,248

[30] Foreign Application Priority Data

Sept. 16, 1971 Germany............................ 2146262

[52] U.S. Cl. ................. 204/1.5; 204/260; 423/250; 423/251; 423/259
[51] Int. Cl............................................. C01g 56/00
[58] Field of Search ............. 204/1.5, 260; 423/250, 423/251, 259

[56] References Cited
UNITED STATES PATENTS

| | | | |
|---|---|---|---|
| 3,030,175 | 4/1962 | Magner et al.................... | 423/259 X |
| 3,361,651 | 1/1968 | Parkinson et al.................. | 204/1.5 |
| 3,390,065 | 6/1968 | Cooper............................... | 204/95 |
| 3,616,275 | 10/1971 | Schneider et al.................. | 204/1.5 |

FOREIGN PATENTS OR APPLICATIONS 1,578,939  7/1969  France................................ 423/259

*Primary Examiner*—Benjamin R. Padgett
*Assistant Examiner*—R. L. Tate
*Attorney, Agent, or Firm*—Burgess, Dinklage & Sprung

[57] ABSTRACT

Salt solutions of compounds of fissionable elements are reduced in an electrolysis cell using as the anode metals from the platinum group and a stabilizer. The process is carried out in a liquid-tight hollow graphite body which acts as the cathode and as the container for the catholyte and anolyte.

Apparatus for reducing the salt solutions includes electrolysis cell means having a liquid-tight hollow graphite body which acts as the cathode and as the container for the catholyte and anolyte, a diaphragm separating the catholyte and anolyte and a coaxially positioned anode within the graphite hollow body.

12 Claims, 2 Drawing Figures

PROCESS FOR THE ELECTROLYTIC REDUCTION OF FISSIONABLE ELEMENTS

BACKGROUND

This invention relates to a process and an apparatus for reducing compounds of nuclear fissionable elements.

Compounds of uranium and compounds of transuranic elements can be continuously reduced in an electrolysis cell. Uranium (VI) compounds can be reduced to uranium (IV) compounds; plutonium (VI) or plutonium (IV) compounds to plutonium (III) compounds; and neptunium (VI) or neptunium (V) compounds to neptunium (IV) compounds.

The process and the apparatus according to the invention are particularly advantageous for reducing uranyl salt solutions which are encountered in nuclear-fuel technology. They can be used to process solutions having any content of fissionable uranium-235. Accordingly, reference in the following is made by way of example to the reduction of solutions of uranyl salts. Both the process and the apparatus according to the invention can be applied too without difficulty to transuranic elements.

One of the most important process stages in the wet manufacture of uranium tetrafluoride, which is of considerable commercial significance as an intermediate in the production of uranium hexafluoride, is the reduction of aqueous solutions of uranyl salts to give uranium (IV) salt solutions. Processes which allow the uranyl nitrate solutions which are encountered in nuclear fuel technology to be reduced by electrolysis are of particular advantage because they do not require previous removal of the nitrate ion.

Uranium (IV) salt solutions obtained in this way can readily be reacted to give uranium tetrafluoride by the wet method. Uranium (IV) nitrate is also used to an increasing extent as a reducing agent for plutonium (IV) nitrate solutions of the kind which accumulate during the regeneration of irradiated nuclear fuels.

In electrolytic reduction of uranyl ions in nitrate-containing solutions, the cathode and anode compartments must be separated from one another by means of a diaphragm. In addition, the catholyte must contain a stabiliser against any more or less small quantities of nitrous acid formed during the reaction because nitrous acid would otherwise reoxidise uranium (IV) ions already formed. Hydrazine or amidosulphonic acid is preferably added to the catholyte for this purpose, as already known.

Hitherto, metals from the platinum group have been used exclusively as anode materials in such cells, whereas various materials can be used for the cathodes.

Conventional cells, for example, use mercury as a cathode material because of its high over potential for hydrogen. Unfortunately, the use of mercury necessitates a complicated cell structure which takes up a lot of space, especially for electrolytes enriched with fissionable isotopes, because of the flat horizontal structure of mercury cells. The gradual enrichment of amalgams of fission products in the mercury cathode must be regarded as a further disadvantage insofar as it necessitates frequent replacement of the mercury, especially in the case of the preparation of reagents for regeneration installations. In addition, the mercury is only stable with respect to nitric acid provided that sufficient stabiliser against nitrous acid is present or provided that it is connected as the cathode. The second of these two requirements is not always satisfied as, for example, disturbances in operation are possible.

Electrolysis cells are also known which use auxiliary electrodes in addition to the cathode and the anode. Through suitable regulation of voltage or current density, these electrodes are intended to prevent undesirable secondary reactions occurring on the cathode, such as the formation of hydrogen according to equation 1:

$$2H_2O = 2H_2 + O_2 \qquad (1)$$

(total electrolytic reaction)

When used on an industrial scale, these cells involve very considerable additional outlays in terms of energy supply (requiring variable as opposed to fixed rectifiers).

The formation of hydrogen must be suppressed in the reduction of solutions of uranyl salts in nitric acid because it is accompanied by the destruction of the stabiliser provided against nitrous acid.

Where platinum, platinum alloys or platinum-coated materials are used for the cathode, the low hydrogen over potential of the platinum is a serious disadvantage, quite apart from the high costs of such metals.

In the wet manufacture of uranium tetrafluoride from solutions containing nitric acid, it is advantageous if cathode materials which are resistant not only to nitric acid but also to hydrofluoric acid can be used because, following the precipitation of uranium tetrafluoride, hydrofluoric acid is present in the mother liquor together with uranyl ions and a considerable quantity of free nitric acid. In such cases the mother liquor can be advantageously recycled in order that the nitric acid may be reused in the reduction according to equation 2:

$$2UO_2(NO_3)_2 + 4HNO_3 \rightarrow 2\ U(NO_3)_4 + 2H_2O + O_2 \qquad (2)$$

(total electrolytic reaction)

SUMMARY

The present invention relates to a process for the reduction of salt solutions of compounds of fissionable elements in an electrolysis cell in which the anodes are made up of metals from the platinum group (Ru, Rh, Pd, Os, Ir, Pt) or are coated with metals from the platinum group, a stabiliser is provided, and liquid-tight graphite is used as the cathode material, the electrolyte, optionally containing fluoride ions, being accommodated in a cavity within the cathode.

The invention also relates to an apparatus for carrying out the process which comprises a. an electrolysis cell of liquid-tight graphite in the form of a, preferably cylindrical, hollow body which acts both as the cathode and as a container for the electrolyte;
b. a diaphragm which is resistant to the catholyte; and
c. an anode arranged coaxially in the direction of the axis of the cylindrical electrolysis cell.

DESCRIPTION OF THE DRAWING

The present invention will be more fully understood from the following description taken in conjunction with the accompanying drawing wherein.

Gas-tight and liquid-tight graphite with a very low content of impurities, especially those which reduce the hydrogen over potential, possess the properties which are important for cathode materials in this process. In addition, this material is extremely economical compared with the material used in noble-metal cathodes, and is resistant to the mineral acids normally used, such as nitric acid, hydrochloric acid, hydrofluoric acid, sulphuric acid, or mixtures thereof, at the temperatures used in the range of from 10° to 90°C, preferably from 15° to 60°C. Accordingly, it is possible to electrolyse solutions of uranyl salts with any of these acids present.

This possibility is of considerable significance in the electrolysis of uranyl nitrate solutions which contain fluoride. As already mentioned, fluoride-containing uranyl nitrate solutions are formed as the mother liquors from the precipitation of uranium tetrafluoride from uranium (IV) nitrate solutions where the electrolytic reduction of the uranyl salt solutions has not been carried through to completion. A partial reduction of the uranyl salt solution is effected as this enables the electrolysis cell to be operated in an economically favourable range. Thus, the electrolytic reduction may be stopped after, for example, approximately 80% of the reduction has been effected. However, the catholyte removed may be delivered to a second electrolysis cell of a similar kind to effect reduction of uranyl nitrate still present. The composition of the catholyte can vary from about 0.5 to 6 mol/l, preferably from 1 to 4 mol/l of nitric acid; from 0.2 to 2.0 mol/l, preferably from 0.5 to 1.5 mol/l of uranium; from 0 to 1.0 mol/l, preferably from 0.05 to 0.5 mol/l of hydrofluoric acid; and from 0.1 to 0.5 mol/l of stabiliser.

The anolyte may comprise any electrolyte which is compatible with the catholyte but, if possible, it should not contain any fluoride or hydrazine. Preferably, it corresponds in composition to the catholyte or to free nitric acid. It is possible to use from 0.1 to 14-molar, and preferably from 0.5 to 5-molar nitric acid.

A further advantage of the cathode material used here lies in the avoidance of impurities which may be introduced into the catholyte where metals are used for the cathode or container.

Figure 1:
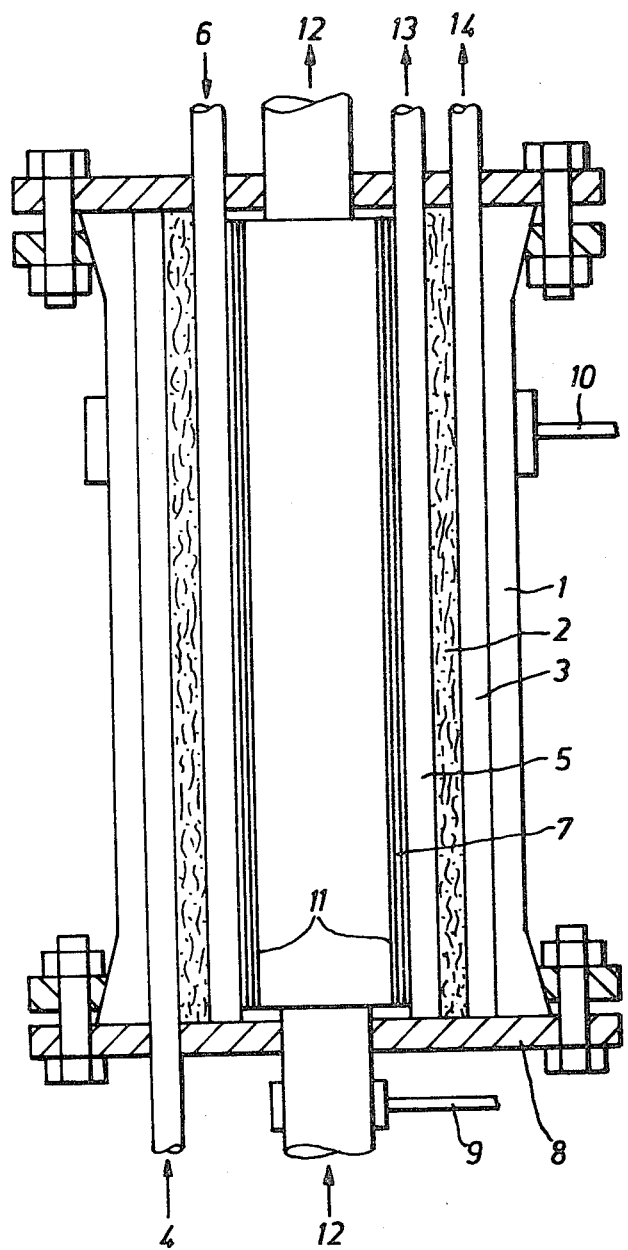
FIG. 1 is a sectional view of the electrolysis cell of the invention suitable for carrying out the process of the invention.
Figure 2:
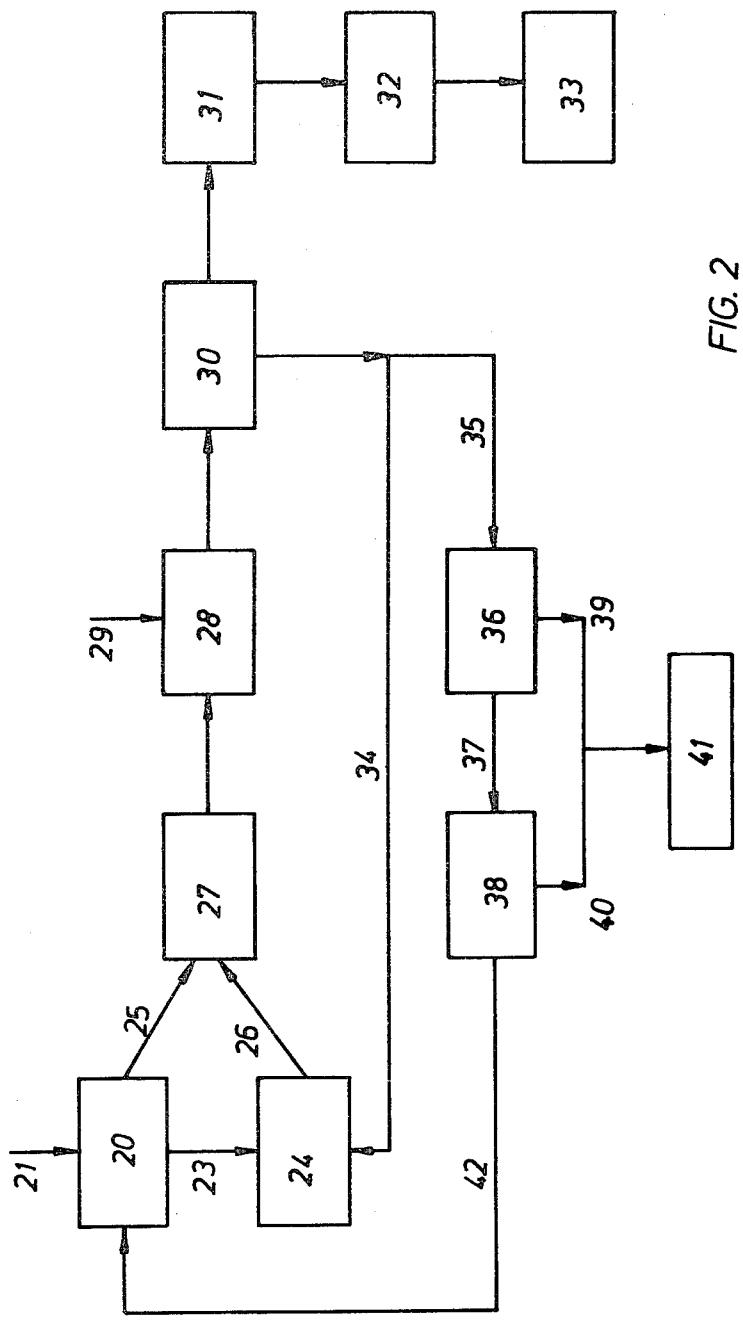
FIG. 2 is a flow diagram of a preferred embodiment illustrating the production of uranium tetrafluoride.

The performance of a process according to the invention is illustrated in FIG. 1 and its application to the production of uranium tetrafluoride is illustrated in FIG. 2.

In FIG. 1:
1 is a graphite tube (cathode);
2 a diaphragm;
3 the cathode compartment;
4 the catholyte inlet;
5 the anode compartment;
6 the anolyte inlet;
7 the anode;
8 a flange;
9 a current supply line (anode);
10 a current supply line (cathode);
11 a platinised tube;
12 an internal cooling means;
13 a gas outlet; and
14 the outlet for the reduced catholyte.

More particularly, FIG. 1 shows the graphite tube 1 designed to act both as cathode and as container for the electrolyte, a coaxially arranged diaphragm 2 of a material resistant to the catholyte being accommodated in the cathode compartment 3. The catholyte can be introduced through 4. Porous sintered corundum materials or porous organic diaphragms are eminently suitable. One or more anodes 7, either platinised or coated with a metal from the platinum group, are installed within the anode compartment 5 which is surrounded by the diaphragm and which contains anolyte which can be introduced through 6. Depending upon their design, the anodes 7 can be supplied with current through 9 from one or from both ends of the graphite tube which are closed with matching electrically insulating flanges 8. The cathode is supplied with current through 10. In order to dissipate the heat produced during the electrolytic process, the catholyte and anolyte must be cooled. In the case of the catholyte, this is advantageously achieved by recycling the catholyte through a heat exchanger (not shown) outside the electrolysis cell. The anolyte can be cooled in basically the same way. However, the cell design according to the invention also provides for the installation of a directly cooled anode which may for this purpose be made in the form of an externally platinised tube 11 cooled internally through 12. The anolyte can be forced into the cathode compartment by a variable pressure difference through the diaphragm 2. Advantageously, some fresh uranyl nitrate is introduced by way of the anolyte whereas the rest is introduced directly as catholyte with some of the mother liquor from the precipitation of uranium tetrafluoride. The analytically produced gases, mainly oxygen, are removed through 13. The reduced catholyte solution is discharged through 14. The diagrammatically illustrated cell can either be connected suitably in series or operated as an individual cell. The dimensions of the cells may be favourably adapted to the requisite, geometrically below-critical dimensions for isotope mixtures of any conceivable degree of enrichment with fissionable isotopes, such as enriched uranium-235, uranium-plutonium mixtures and solutions of the kind which occur in the nuclear fuel cycle during the regeneration of irradiated nuclear fuel elements.

Since the dimensions of the apparatus used to react fissionable materials must lie in the geometrically below-critical range, it is necessary to obtain the highest possible volume-time yields using small cells. The electrolysis cell described here is eminently suitable for this purpose by virtue of its closed design because it allows higher liquid-circulation rates and hence higher cathodic current densities than open cells. One particular advantage in this respect is the simultaneous use of graphite as the container and cathode material. With this arrangement, the current density allowed at the cathode, which amounts to from 30 to 40% of the anodic current density (using platinised anodes) in the absence of any hydrogen evolution, can be optimally utilised because of the large cathode surface. In addition, the chemical bath resistances can be kept low by having narrow spaces between the electrodes.

A graphite which is suitable for use as cathode and container allows maximum current densities of 5,000 amperes/m² of cathode surface without any appreciable evolution of hydrogen and with a consumption of less than 0.02 mol of hydrazine stabiliser per mol of uranium (IV) nitrate. The electrolysis cell is preferably operated at current densities of from about 3,000 to 4,000 amperes/m² of cathode surface.

The favourable application of the process according to the invention for the electrolysis of fluoride-containing uranyl nitrate solutions in a process for the production of uranium tetrafluoride, is demonstrated with reference to the block diagram of FIG. 2 in the following:

A supply vessel 20 for the anolyte is supplied with fresh uranyl nitrate solution through a pipe 21. A supply vessel 24 for the catholyte can also be supplied with uranyl nitrate solution through a pipe 23. Pipes 25 and 26 enable the anode and cathode compartments of the electrolysis cell 27 to be supplied with anolyte and catholyte solution, respectively. The introduction of fresh uranyl nitrate solution into the electrolysis cell is carried out partly by way of the anolyte and partly as catholyte together with some mother liquor from the precipitation of uranium tetrafluoride. Electrolytic reduction of the uranyl nitrate solution takes place in 27. The reduced solution containing uranium (IV) ions is transferred to an apparatus 28 in which uranium tetrafluoride is precipitated by the introduction of hydrofluoric acid through 29. Following transfer to a filter apparatus 30, UF₄-hydrate is separated off, dried in a dryer 31, calcined in a calcining unit 32 and stored in a supply vessel 33. Part of the nitric-acid- and hydrofluoric-acid-containing mother liquor from the precipitation of the uranium tetrafluoride which accumulates in 30 during filtration is delivered through a pipe 34 to the catholyte supply vessel 24 and the rest is delivered through a pipe 35 into an extraction installation 36 in which non-reduced uranyl nitrate is extracted and delivered through a pipe 37 into an evaporator 38. The acid spent solutions which are left behind during the extraction in 36 and which do not contain any more uranium, and the water which accumulates during the evaporation process in 38, are guided through pipes 39 and 40 into a collecting vessel 41. Extracted purified uranyl nitrate from 38 can be returned through a pipe 42 to the supply vessel 20 for the anolyte solution.

The process according to the invention is illustrated in the following Example:

EXAMPLE

An electrolysis cell for continuous operation according to FIG. 1, but fitted for separate cooling, both of the anolyte and catholyte, had the following dimensions and properties:

| | |
|---|---|
| Graphite tube: | Length: 400 mm |
| | diameter (external/internal) 70/50 mm |
| | active cathode surface: 0.0628 m² |
| Water-accessible pore volume: | 2 ± 2% |
| Ash content: | max. 0.15% |
| Graphiting level: | min. 99% |
| Spec. electr. resistance longitudinal and transverse: | 8 – 12 Ω mm²/m |
| Flexural strength: | 400 ± 100 kp/cm² |
| Max. pore diameter: | 2 microns |
| Max. 80 ppm of vanadium as impurity reducing hydrogen over potential; other such impurities not detectable. | |
| Diaphragm: | Al₂O₃ porous; water-accessible pore volume 30%; length 400 mm; diameter 35/27 mm |
| Anode: | titanium cylinder; diameter 15 mm; wrapped and welded inside the cell over a length of 400 mm with platinum wire 30 microns thick and 1 mm wide; active anode surface 0.0188 m² |
| Composition of the aqueous electrolyte solution | |
| Catholyte: | 0.9 mol/l of uranyl nitrate; 0.4 mol/l of uranium (IV) nitrate; 2.8 mol/l of HNO₃; 0.185 mol/l of hydrazine; 0.15 mol/l of HF |
| Anolyte: | 1.3 mol/l of uranyl nitrate; 3.6 mol/l of HNO₃ |

For cooling and homogenisation, the catholyte and anolyte were recycled through coolers arranged outside the cell by means of centrifugal pumps. The catholyte was recycled at a rate of 1,500 litres per hour and the anolyte at a rate of 1,000 litres per hour. The temperature of the electrolyte was maintained at 44° to 45°C by a thermostat. 2.5 litres of anolyte per hour were introduced into the anolyte circuit by means of a metering pump. By means of a pressure governor, through which oxygen produced at the anode is released, the anolyte quantity was kept constant and a quantity corresponding to the feed was forced into the catholyte through the diaphragm.

10.25 l/hour were continuously removed from the catholyte circuit and 7.76 l/hour of the following composition introduced: 1.3 mol/l of uranyl nitrate; traces of uranium (IV) nitrate; 0.25 mol/l of hydrazine; 0.2 mol/l of HF.

The applied voltage was 8.3 volts; the current intensity was 225 amperes.

4.1 mol/h of uranyl nitrate were reduced to uranium (IV) nitrate, corresponding to an electrolytic current efficiency of from 97 to 98%. The hydrazine consumption was 0.05 mol/hour or 2.5% of the quantity used.

What is claimed is:

1. In a process for reducing salt solutions containing uranyl nitrate in an electrolysis cell having a catholyte stabilizer and anodes of metals from the platinum group, or anodes coated with metals from the platinum group, the improvement which comprises carrying out said process in an enclosed electrolysis zone defined by a liquid-tight sealed tubular graphite cathode containing a maximum of 80 ppm of vanadium and an inner concentric anode, said zone having compartments between the cathode and anode separated by an annular concentric diaphragm for containing the catholyte and anolyte, said catholyte having a composition of from 1 to 4 mol/l of nitric acid, from 0.5 to 1.5 mol/l of uranium; from 0.05 to 0.5 mol/l of hydrofluoric acid and from 0.1 to 0.5 mol/l of stabilizer.

2. Process of claim 1 wherein uranium (VI) compounds ar reduced to uranium (IV) compounds.

3. Process of claim 1 wherein the electrolysis is carried out at temperatures of from about 10° to 90°C.

4. Process of claim 1 wherein the electrolysis is carried out at temperatures of from about 15° to 60°C.

5. Process of claim 1 wherein the catholyte contains about 0.5 to 0.6 mol/l of nitric acid; from 0.2 to 2.0 mol/l of uranium; and from 0.1 to 0.5 mol/l of stabilizer.

6. Process of claim 1 wherein the stabilizer is hydrazine or amidosulphonic acid.

7. Process of claim 1 wherein the anolyte corresponds in its composition to that of the catholyte but does not contain any fluoride or any stabilizer.

8. Process of claim 1 wherein the anolyte comproses from 0.1 to 14-molar nitric acid.

9. Process of claim 8 whherein the anolyte compriss from 0.5 to 5-molar nitric acid.

10. Process of claim 2 wherein the mother liquors accumulating during the precipitation of uranium tetrafluoride from uranium (IV) nitrate solutions with hydrofluoric acid are delivered to the catholyte.

11. Process of claim 1 wherein the graphite cathode is loaded with a current density of at most 5,000 amperes/$m^2$ of cathode surface.

12. Process of claim 11 wherein the graphite cathode is loaded with a current density of from about 3,000 to 4,000 amperes/$m^2$ of cathode surface.

* * * * *